US005672404A

United States Patent [19]

Callahan, Jr. et al.

[11] Patent Number: 5,672,404

[45] Date of Patent: Sep. 30, 1997

[54] ATTACHMENT STRIPS

[75] Inventors: Joseph P. Callahan, Jr.; Kevin M. Hamer, both of St. Paul; Patricia R. Konsti, Oakdale; David C. Windorski, Woodbury, all of Minn.

[73] Assignee: Minnesota Mining and Manufacturing Company, St. Paul, Minn.

[21] Appl. No.: 571,725

[22] Filed: Dec. 13, 1995

[51] Int. Cl.$^6$ .............................. A44B 13/00; B32B 7/12

[52] U.S. Cl. .......................... 428/100; 428/343; 604/389; 604/391; 128/DIG. 15

[58] Field of Search .................................... 428/100, 343; 604/389, 391; 24/304; 128/DIG. 15

[56] References Cited

U.S. PATENT DOCUMENTS

| | | | |
|---|---|---|---|
| Re. 24,906 | 12/1960 | Ulrich | 206/59 |
| 2,753,284 | 7/1956 | Pahl et al. | 154/53.5 |
| 3,054,400 | 9/1962 | Lizo | 128/DIG. 15 X |
| 3,691,140 | 9/1972 | Silver | 260/78.5 |
| 3,773,580 | 11/1973 | Provost | 428/100 X |
| 3,857,731 | 12/1974 | Merrill, Jr. et al. | 177/122 |
| 4,166,152 | 8/1979 | Baker et al. | 428/522 |
| 4,216,257 | 8/1980 | Schams et al. | 428/100 X |
| 4,672,722 | 6/1987 | Malamed | 428/100 X |
| 4,770,320 | 9/1988 | Miles et al. | 221/33 |
| 4,869,724 | 9/1989 | Scripps | 604/389 |
| 4,931,344 | 6/1990 | Ogawa et al. | 428/100 |
| 5,058,247 | 10/1991 | Thomas et al. | 24/448 |
| 5,077,870 | 1/1992 | Melbye et al. | 24/452 |
| 5,116,563 | 5/1992 | Thomas et al. | 264/167 |
| 5,149,573 | 9/1992 | Kobe et al. | 428/100 X |
| 5,230,851 | 7/1993 | Thomas | 264/145 |
| 5,243,991 | 9/1993 | Marks | 128/DIG. 15 X |
| 5,382,462 | 1/1995 | Pacione | 428/100 X |
| 5,518,144 | 5/1996 | Samuelson et al. | 221/33 |
| 5,571,617 | 11/1996 | Cooprider et al. | 428/341 |

FOREIGN PATENT DOCUMENTS

| | | |
|---|---|---|
| 306 332 | 3/1989 | European Pat. Off. . |
| A 0 374 730 | 6/1990 | European Pat. Off. . |
| 0 452 368 B1 | 7/1994 | European Pat. Off. . |
| A 64 754 | 9/1973 | Luxembourg . |
| WO92/11333 | 7/1992 | WIPO . |

OTHER PUBLICATIONS

U.S. Patent Application Ser. No. 08/263,601 filed Jun. 21, 1994.

*Primary Examiner*—Daniel Zirker
*Attorney, Agent, or Firm*—Gary L. Griswold; Walter N. Kirn; William L. Huebsch

[57] ABSTRACT

Attachment strips that can be withdrawn from an enclosure, each comprising a flexible backing layer, a field of hooks along and projecting from one of its surfaces; and a first layer of pressure sensitive adhesive along one of its surfaces. The strips can be releasably adhered to each other by their layers of adhesive to form a stack in which first and second ends of successive strips are adjacent. The strips have un-adhered portions or their adhesion to adjacent strips is controlled so that when the stack of strips is positioned in the chamber with the first end portion of the uppermost strip in the stack projecting through the slot and resting against the adjacent abutment surface, and tension is applied to that uppermost strip to pull it through the slot, that tension will cause successive portions of the uppermost strip to peel from the first underlying strip in the stack and will cause separation of the first end portion of the first underlying strip from the second underlying strip, and movement of the first end portion of the first underlying strip through the slot with the second end portion of said uppermost strip to leave, after the uppermost strip is fully peeled from the first portion of the first underlying strip, the first end portion of that first underlying strip in a position projecting through the slot and resting against one of the abutment surfaces disposed in a position where it may be gasped for manual removal in a manner similar to the removal of the uppermost strip.

8 Claims, 8 Drawing Sheets

ATTACHMENT STRIPS

CROSS-REFERENCE TO RELATED APPLICATION

This application claims priority to U.S. Provisional patent application No. 60/003,376, filed Sep. 7, 1995, now abandoned.

1. Technical Field

The present invention relates to strips of material adapted to be used to attach an object to a vertical substrate and support that object from the substrate.

2. Disclosure of Invention

The present invention provides an attachment strip adapted to attach an object (e.g., a picture, calendar, sheet of information, flamed certificate, plaque, etc.) to a fabric substrate (e.g., a fabric covered cubicle wall) to support that object from the substrate; and in one aspect to a stack of such attachment strips that can conveniently be withdrawn seriatim from a housing.

According to the present invention there is provided an attachment strip for removably attaching an object to a substrate, which attachment strip comprises a flexible backing layer (e.g., of polymeric material or paper), a field of hooks along and projecting from one of its major surfaces, and a layer of pressure sensitive adhesive (e.g., permanent or repositionable pressure sensitive adhesive) along one of its major surfaces. The field of hooks can be on one major surface and the layer of pressure sensitive adhesive on the other, in which case the field of hooks can extend either entirely or partially over one major surface and the layer of pressure sensitive adhesive can extend either entirely or partially over the other.

Alternatively, both the field of hooks and the layer of pressure sensitive adhesive can be on the same major surface with the field of hooks being on a portion (e.g., one half) of that surface adjacent a first end of the backing, and the layer of pressure sensitive adhesive being on a portion (e.g., one half) of that surface adjacent a second opposite end of the backing.

A plurality of such attachment strips can be adapted to be withdrawn seriatim from an enclosure comprising walls defining a chamber, which walls include a bottom wall, and two top wall portions having spaced opposed first and second abutment surfaces extending generally parallel to the ends of the bottom wall, which abutment surfaces define a wide generally central transverse slot. Those strips are releasably adhered to each other by releasable adhesion of the layers of pressure sensitive adhesive to form a stack with side edges of the strips in the stack aligned and with first and second ends of successive strips in the stack adjacent. A first end portion of each of the strips adjacent its first end is either unadhered or the strips have release means for providing a first adhesion level between the layer of adhesive on that first end portion and the adjacent underlying strip in the stack to which that layer of adhesive is releasably adhered that affords easy separation of those adjacent strips along that first end portion. The strips have attachment means for providing a second adhesion level along a second end portion of each of the strips adjacent its second end between the layer of adhesive and the adjacent underlying strip in the stack. That second adhesion level provides a release force that is higher than any release force along the first end portion of the strip and firmly adheres the strip to the adjacent underlying strip in the stack during separation of the uppermost strip along its first end portion, while affording peeling away of that second end portion of the uppermost strip from the stack.

The stack of strips can be positioned in the chamber of the housing with the ends of the strips generally parallel to the ends of the bottom wall, and with the first end portion of the uppermost strip in the stack projecting through the slot and resting against the adjacent abutment surface. When tension is then applied to that uppermost strip to pull it through the slot, that tension will cause successive portions of the uppermost strip to peel from the first underlying strip in the stack and will cause separation of the first end portion of the first underlying strip from the second underlying strip, and movement of the first end portion of the first underlying strip through the slot with the second end portion of the uppermost strip to leave, after the uppermost strip is fully peeled from the first portion of the first underlying strip, the first end portion of that first underlying strip in a position projecting through the slot and resting against the abutment surface opposite the abutment surface against which the uppermost strip was originally supported and disposed in a position where it may be grasped for manual removal in a manner similar to the removal of the uppermost strip.

Preferably the hooks in the field of hooks are integral with at least a portion of the backing layer, small in size, and adapted to engage the types of fabrics typically used to cover dividers used in forming cubicles. Suitable hooks include those described in U.S. Pat. Nos. 5,116,563 and 5,230,851, or those described in U.S. patent application Ser. No. 08/048,874 filed Apr. 16, 1993.

The adhesive used in the layer of pressure sensitive adhesive can be either a repositionable pressure sensitive adhesive (i.e., an adhesives of the type which allows repeated removal and reapplication from an object without damage), a permanent pressure sensitive adhesive (i.e., an adhesive that has a high peal strength), or a combination of those adhesives, depending on the intended use of the attachment strip. Useful repositionable pressure sensitive adhesives include those described in U.S. Pat. No. 5,571,617 entitled "Pressure Sensitive Adhesive Comprising Tacky Surface Active Microspheres"; or an adhesive from the class of adhesives based on solid inherently tacky, elastomeric microspheres, such as those disclosed in U.S. Pat. Nos. 3,691,140 (Silver), 3,857,731 (Merrill et al.), 4,166,152 (Baker et al.), and U.S. Pat. No. 5,571,617 (Cooprider et al.) although not limited to these examples. Useful permanent pressure sensitive adhesives include those made using natural robber such as are described in U.S. Pat. No. 2,753,284 (Walter et. al.), those including block copolymer elastomers such as are described in European patent No. 306,232 (Miller, et. al.), and those including acrylate copolymers such as are described in U.S. Pat. No. Re 24,906 (Ulrich).

BRIEF DESCRIPTION OF DRAWING

The present invention will be further described with reference to the accompanying drawing wherein like reference numerals refer to like parts in the several views, and wherein.

DETAILED DESCRIPTION

Figure 1:
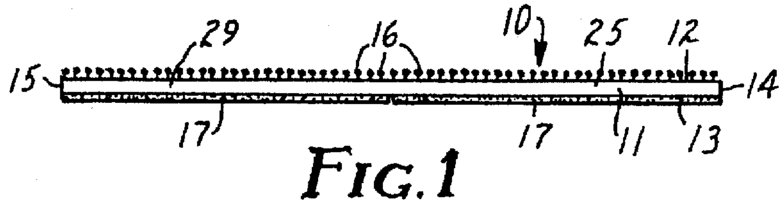
FIG. 1 is an edge view of a first embodiment of an attachment strip according to the present invention.
Figure 2:
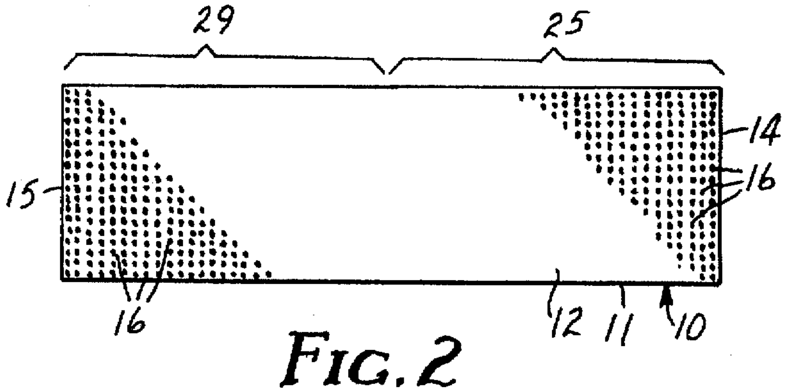
FIG. 2 is a top view of the attachment strip illustrated in FIG. 1.

Referring now to FIGS. 1 through 5 of the drawing, there is shown a first embodiment of an attachment strip according to the present invention generally designated by the reference numeral 10.

Generally the attachment strip 10 comprises a flexible backing layer 11 having opposite first and second major surfaces 12 and 13 and first and second opposite ends 14 and 15. A field of hooks 16 are along and project from the entire first surface 12 of the backing layer 11, and a layer 17 of pressure sensitive adhesive entirely covers the second surface 13 of the backing layer 11.

The backing layer 11 could be of paper or other fibrous materials, but preferably is a layer of polymeric material. (e.g., 0.004 to 0.005 inch thick polypropylene or 0.0009 to 0.002 inch thick polyethylene terapthalate).

The field of hooks 16 can be formed as a unitary structure with the backing layer 11 as illustrated, or can be formed as a unitary structure with a backing that is laminated to the backing layer 11. Either way, the field of hooks 16 is preferably made in accordance with the teachings in either U.S. Pat. No. 5,077,870 or U.S. patent application No. 08/048,874 filed Apr. 16, 1993, the contents whereof are hereby incorporated herein by reference. Alternatively the field of hooks 16 and backing layer 11 could be made by the teachings of U.S. Pat. Nos. 5,058,247, 5,116,563 and 5,230,851, the contents whereof are also incorporated herein by reference. The field of mushroom shaped hooks described in U.S. patent application Ser. No. 08/048,874, makes good engagement in shear with certain types of loop materials and conventional fabrics (e.g., fabrics used on panels used to form work cubicles having thread densities in the range of about 8 to 32 threads per inch which are commonly made of all polyester fibers or of blends of polyester fibers with fibers of other materials) because of the density, small size, and shape of its hooks. The backing layer 11 is preferably homogeneous and of thermoplastic resin and the field of hooks 16 are integral with at least a portion of the backing layer 11 and comprise an array of upstanding stems distributed across the first surface 11 of the backing, each having a mushroom head having a circular disc shape with a generally planar end surfaces opposite the backing layer 11. The disc shaped heads preferably have diameter to thickness ratios of greater than about 1.5 to 1, the hooks are of uniform height, preferably of from about 0.10 to 1.27 mm in height, and more preferably from about 0.18 to 0.51 mm in height; have a density on the backing preferably of from 60 to 1,550 hooks per square centimeter, and more preferably from about 125 to 690 hooks per square centimeter; have a stem diameter adjacent the heads of the hooks preferably of from 0.076 to 0.635 mm, and more preferably from about 0.127 to 0.305 mm; have circular disc-like heads that project radially past the stems on each side preferably by an average of about 0.013 to 0.254 mm, and more preferably by an average of about 0.025 to 0.127 mm and have average thicknesses between their outer and inner surfaces (i.e., measured in a direction parallel to the axis of the stems) preferably of from about 0.013 to 0.254 mm and more preferably of from about 0.025 mm to 0.127 mm, with the heads having average head diameter (i.e., measured radially of the axis of the heads and stems) to average head thickness ratio preferably of from 1.5:1 to 12:1, and more preferably from 2.5:1 to 6:1. The hooks should be distributed substantially uniformly over the entire area of the field of hooks 16 usually in a square or hexagonal array.

The layer 17 of pressure sensitive adhesive can either be of the repositionable type (described above), or of the permanent type (described above), or a combination of those types (e.g., a portion of each).

Figure 5:
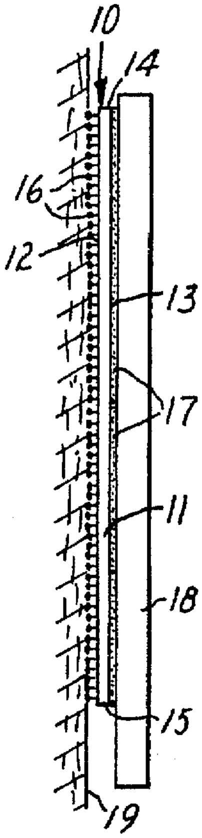
FIG. 5 is a side view of the attachment strip of FIG. 1 attaching an object to a vertical substrate.

As is illustrated in FIG. 5, the attachment strip 10 can be used to attach an object 18 (e.g., a photograph, framed certificate, plaque or sheet of paper beating information, etc.) to a vertical substrate 19 (e.g., a cloth surface of an office cubicle wall) by adhering the layer 17 of adhesive to a rear surface of the object 18, and engaging the field of hooks 16 with loops or loop like fiber portions along the substrate 19.

Figure 3:
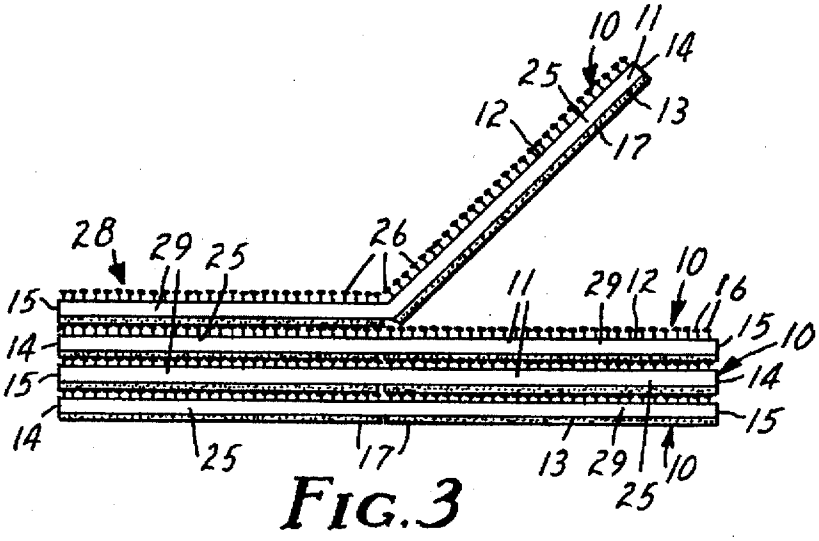
FIG. 3 is an edge view of a plurality of attachment strips of the type illustrated in FIG. 1 adhered together in a stack.
Figure 4:
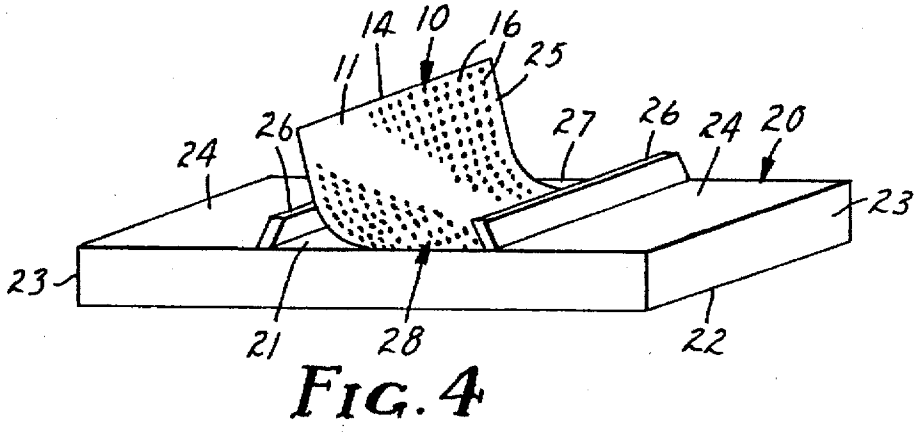
FIG. 4 is a perspective view of an enclosure around the stack of strips of FIG. 3 from which the attachment strips can be individually withdrawn.
Figure 6:
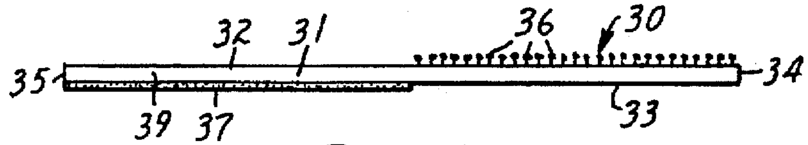
FIG. 6 is an edge view of a second embodiment of an attachment strip according to the present invention.
Figure 7:
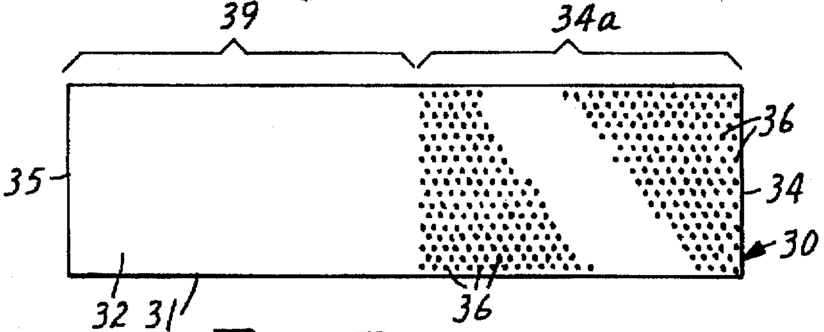
FIG. 7 is a top view of the attachment strip illustrated in FIG. 6.

FIG. 3 illustrates a plurality of the attachment strips 10 adapted for use in an enclosure 20 of the type illustrated in FIG. 4. The enclosure 20 comprises walls defining a chamber 21. Those walls include a bottom wall 22 defining a bottom side of the chamber 21, which bottom wall 22 has opposite ends 23. Those walls also include two top wall portions 24 defining a top side of the chamber 21 opposite its bottom side and having spaced opposed first and second abutment surfaces 26 extending generally parallel to the ends 23 of the bottom wall 22, which abutment surfaces 26 define a wide generally central transverse slot 27. The enclosure 20 and other alternate embodiments of enclosures that could be used to dispense the attachment strips 10 and others of the attachment strips described below are described in U.S. Pat. No. 5,518,144 issued May 21, 1996, the content whereof is incorporated herein by reference.

The plurality of attachment strips 10 illustrated in FIG. 3 are releasably adhered to each other by releasable adhesion between the layers 17 of pressure sensitive adhesive and the field of hooks 16 to form a stack 28 with adjacent ends and longitudinal edges of the strips 10 in the stack 28 aligned and with the first and second ends 14 and 15 of successive strips 10 in the stack 28 adjacent. The strips 10 include release means for providing a first adhesion level between the layer 17 of adhesive on a first end portion 25 (see FIG. 2) of each strip 10 adjacent its first end 14 and the field of hooks 16 on the adjacent underlying strip 10 in the stack that affords fairly easy separation therebetween along that first end portion 25. The strips 10 also include attachment means for providing a second adhesion level between the layer 17 of adhesive along a second end portion 29 (see FIG. 2) of each strip 10 adjacent its second end 15 and the field of hooks 16 on the adjacent underlying strip 10 in the stack 28 that provides a release force therebetween along the second end portion 29 that is higher than the release force therebetween along the first end portion 25 and firmly adheres the uppermost strip 10 to the adjacent underlying strip 10 in the stack 28 during separation of the uppermost strip 10 from the underlying strip 10 along its first end portion 25 while affording peeling away of the uppermost strip 10 from the stack 28 along its second end portion 29.

That combination of release means and attachment means can be provided in many ways including (1) by applying a release coating over the fields of hooks 16 along the second end portions 29 of the strips 10 while providing no such release coating on the field of hooks 16 along the first end portions 25 of the strips 10; (2) using two different adhesives to form the layer 17 of adhesive, including a less aggressive adhesive along the first end portions 25 of the strips 10 than along the second end portions 29 of the strips 10; (3) providing significantly more hooks in the fields of hooks 16 along the first end portions 25 of the strips 10 than along the second end portions 29 of the strips 10 so that the layers 17 of adhesive will adhere more aggressively to the hooks along the first end portions 25 than along the second end portions 29; (4) providing removable release liners over the layer 17 of adhesive along the first end portions 25; or (5) combinations of the above four ways.

The stack 28 of strips 10 can be positioned in the chamber 21 of the enclosure 20 with the ends 14 and 15 of the strips 10 generally parallel to the ends 23 of its bottom wall 22, and with the first end portion 25 of the uppermost strip 10 in the stack 28 projecting through the slot 27 and resting against the adjacent abutment surface 26. Tension can then be manually applied to that first end portion 25 of the uppermost strip 10 to pull it through the slot 27. Such tension will cause successive portions of the second end portion 29 of the uppermost strip 10 to peel from the first underlying strip 10 in the stack 28 and during that peeling will cause separation of the first end portion 25 of the first underlying strip 10 from the second end portion 29 of the second underlying strip 10, and movement of the first end portion 25 of the first underlying strip 10 through the slot 27 with the second end portion 29 of the uppermost strip 10 to leave, after the uppermost strip 10 is fully peeled from the first end portion 25 of the first underlying strip 16, the first end portion 17 of the first underlying strip 10 in a position projecting through the slot 27 and resting against the abutment surface 26 opposite the abutment surface 26 against which the uppermost strip 10 was originally supported, disposed in a position where it may be grasped for manual removal in a manner similar to the removal of the uppermost strip 10.

Referring now to FIGS. 6 through 9 of the drawing, there is shown a second embodiment of an attachment strip according to the present invention generally designated by the reference numeral 30.

Generally the attachment strip 30 comprises a flexible backing layer 31 having opposite first and second major surfaces 32 and 33 and first and second opposite ends 34 and 35. A field of hooks 36 are along and project from a portion of or about half of the first surface 32 adjacent the first end 34 of the backing, and a layer 37 of pressure sensitive adhesive covers a portion of or about half of the second surface 33 adjacent the second end 35 of the backing layer 31. The materials and structures of the backing layer 31, field of hooks 36, and layer 37 of adhesive are essentially the same as those described above with respect to the attachment strip 10.

Figure 9:
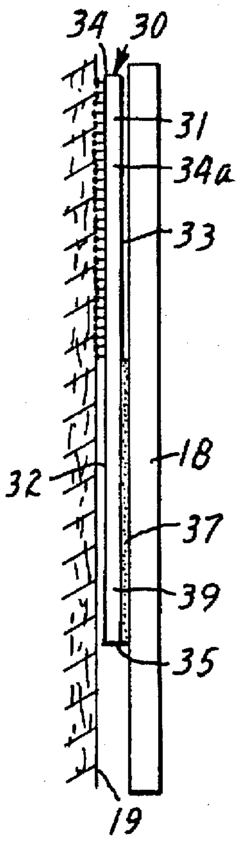
FIG. 9 is a side view of the attachment strip of FIG. 6 attaching an object to a vertical substrate.
Figure 10:
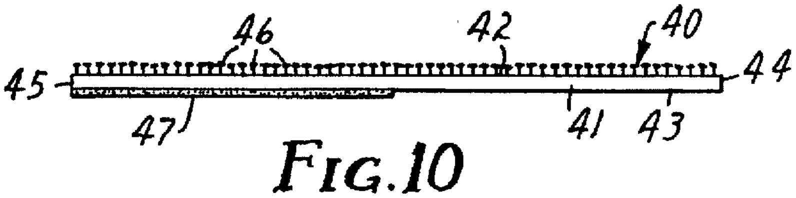
FIG. 10 is an edge view of a third embodiment of an attachment strip according to the present invention.
Figure 11:
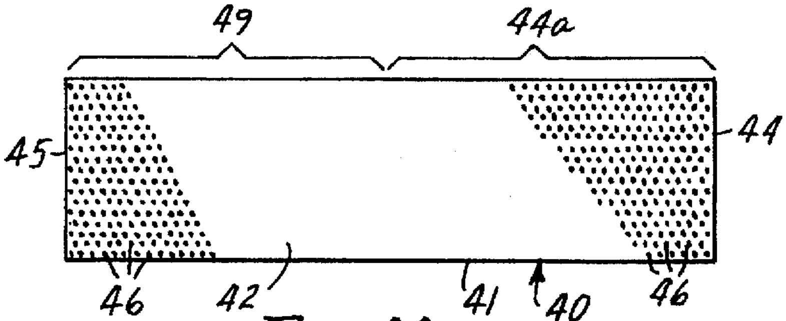
FIG. 11 is a top view of the attachment strip illustrated in FIG. 10.

As is illustrated in FIG. 9, the attachment strip 30 can be used to attach the object 18 (e.g., a photograph, a sheet of paper bearing information, etc.) to the vertical substrate 19 (e.g., a cloth surface of an office cubicle wall) by adhering the layer 37 of adhesive to a rear surface of the object 18, and engaging the field of hooks 36 with loops or loop like fiber portions along the substrate 19.

Figure 8:
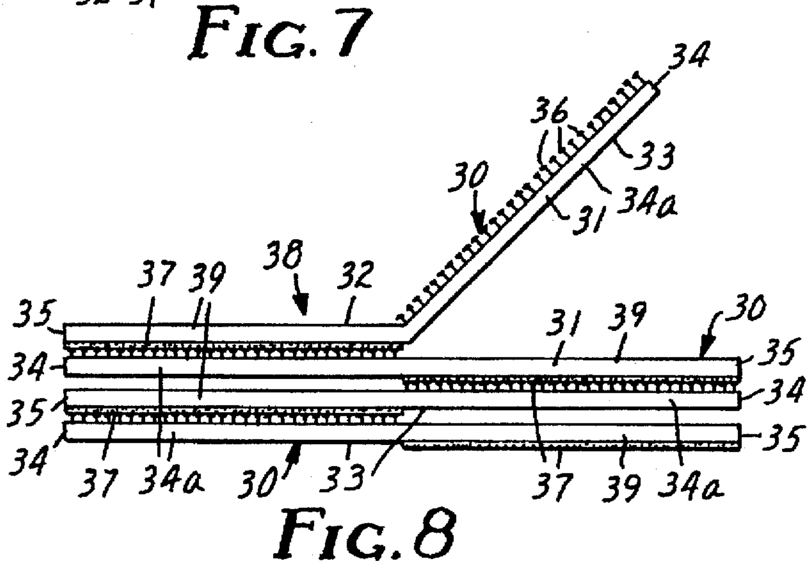
FIG. 8 is an edge view of a plurality of attachment strips of the type illustrated in FIG. 6 adhered together in a stack which, when enclosed in an enclosure of the type illustrated in FIG. 4, allows individual attachment strips to be withdrawn seriatim from the stack in that enclosure.

FIG. 8 illustrates a plurality of the attachment strips 30 adapted for use in an enclosure 20 of the type illustrated in FIG. 4. The plurality of attachment strips 30 illustrated in FIG. 8 are releasably adhered to each other by releasable adhesion of the layers 37 of pressure sensitive adhesive with the fields of hooks 36 on underlying strips 30 to form a stack 38 with longitudinal edges and adjacent ends of the strips 30 in the stack 38 aligned and with the first and second ends 34 and 35 of successive strips 30 in the stack 38 adjacent. Along a first end portion 34*a* (see FIG. 7) of each of the strips 30 adjacent its first end 34 the second surface 33 of the strip 30 is not adhered to the adjacent strip 30 in the stack 38 to afford easy separation of surfaces of those strips 30 from the surfaces of underlying strips 30 along those first end portion 34*a*. The strips 30 also include attachment means (i.e., the presence of the layer 37 of adhesive) for providing a second adhesion level along a second end portion 39 (see FIG. 7) of each of the strip 30 adjacent its second end 35 between the layer 37 of adhesive and the adjacent underlying strip 30 in the stack 38. That second adhesion level provides a release force along the second end portion 39 that is higher than the essentially zero release force along the first end portion 34*a* and firmly adheres the uppermost strip 30 to the adjacent underlying strip 30 in the stack 38 during separation of that uppermost strip 30 along its first end portion 34*a*, while affording peeling away of that uppermost strip 30 from the stack 38 along its second end portion 39.

The stack 38 of strips 30 can be positioned in the chamber 21 of the enclosure 20 illustrated in FIG. 4 with the ends 34 and 35 of the strips 30 generally parallel to the ends 23 of its bottom wall 22, and with the first end portion 34*a* of the uppermost strip 30 in the stack 38 projecting through the slot 27 and resting against the adjacent abutment surface 26. Tension can then be manually applied to that first end portion 34*a* of the uppermost strip 30 to pull it through the slot 27. That tension will cause successive portions of the second end portion 39 of the uppermost strip 30 to peel from the first underlying strip 30 in the stack 38 and during that peeling will cause separation of the first end portion 34*a* of the first underlying strip 30 from the second end portion 39 of the second underlying strip 30, and movement of the first end portion 34*a* of the first underlying strip 30 through the slot 27 with the second end portion 39 of the uppermost strip 30 to leave, after the uppermost strip 30 is fully peeled from the first end portion 34*a* of the first underlying strip 30, the first end portion 34*a* of the first underlying strip 30 in a position projecting through the slot 27 and resting against the abutment surface 26 opposite the abutment surface 26 against which the uppermost strip 30 was originally supported, disposed in a position where it may be grasped for manual removal in a manner similar to the removal of the uppermost strip 30.

Referring now to FIGS. 10 through 13 of the drawing, there is shown a third embodiment of an attachment strip according to the present invention generally designated by the reference numeral 40.

Generally the attachment strip 40 comprises a flexible backing layer 41 having opposite first and second major surfaces 42 and 43 and first and second opposite ends 44 and 45. A field of hooks 46 are along and project from the entire first surface 42 of the backing layer 41, and a layer 47 of pressure sensitive adhesive covers a portion of or about half of the second surface 43 adjacent the second end 45 of the backing layer 41. The materials and structures of the backing layer 41, field of hooks 46, and layer 47 of adhesive are essentially the same as those described above with respect to the attachment strip 10.

Figure 13:
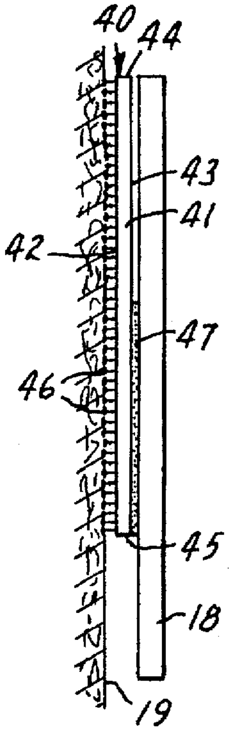
FIG. 13 is a side view of the attachment strip of FIG. 10 attaching an object to a vertical substrate.
Figure 14:
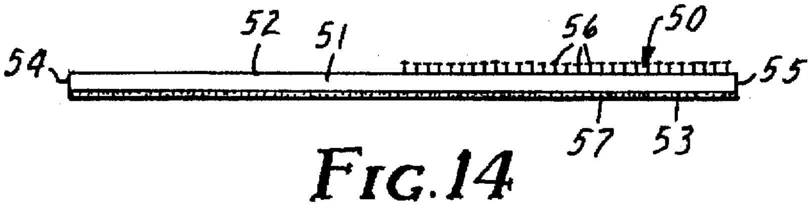
FIG. 14 is an edge view of a third embodiment of an attachment strip according to the present invention.
Figure 15:
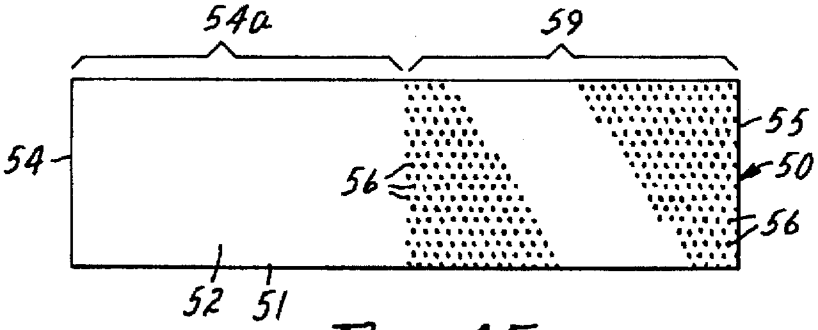
FIG. 15 is a top view of the attachment strip illustrated in FIG. 14.

As is illustrated in FIG. 13, the attachment strip 40 can be used to attach the object 18 (e.g., a photograph, sheet of paper bearing information, etc.) to the vertical substrate 19 (e.g., a cloth surface of an office cubicle wall) by adhering the layer 47 of adhesive to a rear surface of the object 18, and engaging the field of hooks 46 with loops or loop like fiber portions along the substrate 19.

Figure 12:
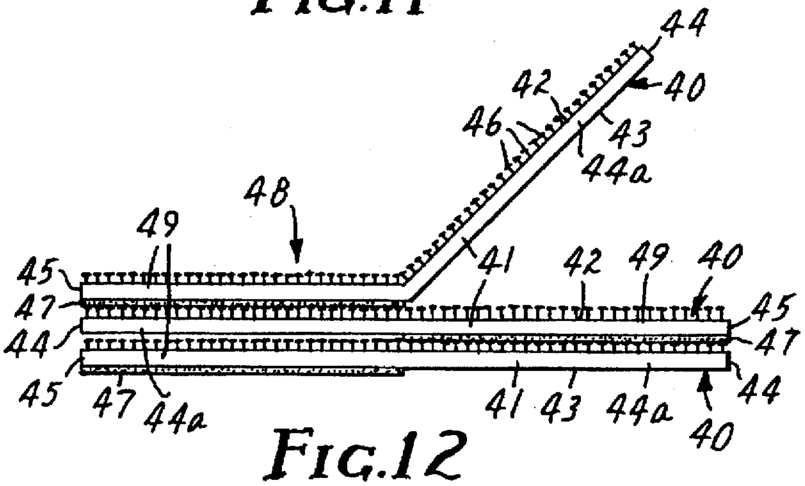
FIG. 12 is an edge view of a plurality of attachment strips of the type illustrated in FIG. 10 adhered together in a stack which, when enclosed in an enclosure of the type illustrated in FIG. 4, allows individual attachment strips to be withdrawn seriatim from the stack in that enclosure.

FIG. 12 illustrates a plurality of the attachment strips 40 adapted for use in an enclosure 20 of the type illustrated in FIG. 4. The plurality of attachment strips 40 illustrated in FIG. 12 are releasably adhered to each other by releasable adhesion of the layers 47 of pressure sensitive adhesive to form a stack 48 with adjacent ends and longitudinal edges of the strips 40 in the stack 48 aligned and with the first and second ends 44 and 45 of successive strips 40 in the stack 48 adjacent. Along a first end portion 44*a* (see FIG. 11) of each of the strips 40 adjacent its first end 44 the strips 40 are not adhered to the adjacent underlying strip 40 in the stack 48 to afford easy separation of surfaces therebetween along that first end portion 44*a*. The strips include attachment means (i.e., the presence of the layer 47 of adhesive) for providing a second adhesion level along a second end portion 49 (see FIG. 11) of each of the strips 40 adjacent its second end 45 between the layer 47 of adhesive and the adjacent underlying strip 40 in the stack 48. That second adhesion level provides a release force with the underlying strip 40 along the second end portion 49 that is higher than the essentially zero release force with the underlying strip 40 along the first end portion 44*a* and firmly adheres the strip 40 to the adjacent underlying strip 40 in the stack 48 during separation of the uppermost strip 40 along its first end portion 45 while affording peeling away of the strip 40 from the underlying strip 40 in the stack 48 along its second end portion 49.

The stack 48 of strips 40 can be positioned in the chamber 21 of the enclosure 20 illustrated in FIG. 4 with the ends 44 and 45 of the strips 40 generally parallel to the ends 23 of its bottom wall 22, and with the first end portion 44*a* of the uppermost strip 40 in the stack 48 projecting through the slot 27 and resting against the adjacent abutment surface 26. Tension can then be manually applied to that first end portion 44*a* of the uppermost strip 40 to pull it through the slot 27. That tension will cause successive portions of the second end portion 49 of the uppermost strip 40 to peel from the first end portion 44*a* of the first underlying strip 40 in the stack 48 and will cause separation of that first end portion 44*a* of the first underlying strip 40 from the second underlying strip 40, and movement of the first end portion 44*a* of the first underlying strip 40 through the slot 27 with the second end portion 49 of the uppermost strip 40 to leave, after the uppermost strip 40 is fully peeled from the first end portion 44*a* of the first underlying strip 40, the first end portion 44*a* of the first underlying strip 40 in a position projecting through the slot 27 and resting against the abutment surface 26 opposite the abutment surface 26 against which the uppermost strip 40 was originally supported and disposed in a position where it may be grasped for manual removal in a manner similar to the removal of the uppermost strip 40.

Referring now to FIGS. 14 through 17 of the drawing, there is shown a fourth embodiment of an attachment strip according to the present invention generally designated by the reference numeral 50.

Generally the attachment strip 50 comprises a flexible backing layer 51 having opposite first and second major surfaces 52 and 53 and first and second opposite ends 54 and 55. A field of hooks 56 integral with at least a portion of the backing layer 51 are along and project from a portion of or about half of the first surface 53 adjacent the first end 54 of the backing layer 51. A layer 57 of pressure sensitive adhesive covers the entire second surface 53 of the backing layer 51. The materials in the backing layer 51, field of hooks 56, and the layer 57 of adhesive are essentially the same as those described above with respect to the attachment strip 10.

Figure 17:
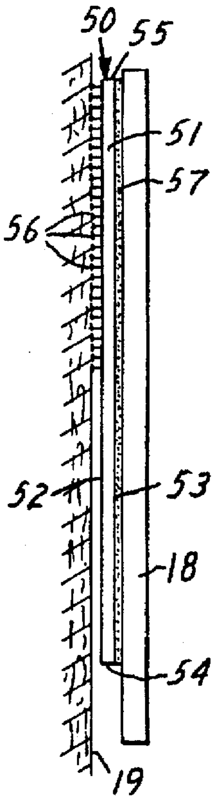
FIG. 17 is a side view of the attachment strip of FIG. 14 attaching an object to a vertical substrate.

As is illustrated in FIG. 17, the attachment strip 50 can be used to attach the object 18 (e.g., a photograph, sheet of paper bearing information, plaque, flamed picture, etc.) to the vertical substrate 19 (e.g., a cloth surface of an office cubicle wall) by adhering the layer 57 of adhesive to a rear surface of the object 18, and engaging the field of hooks 56 with loops or loop like fiber portions along the substrate 19.

Figure 16:
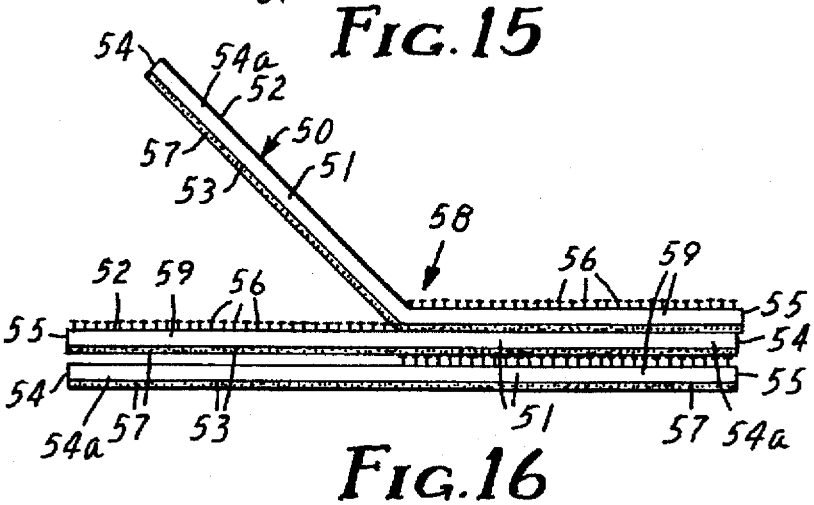
FIG. 16 is an edge view of a plurality of attachment strips of the type illustrated in FIG. 14 adhered together in a stack which, when enclosed in an enclosure of the type illustrated in FIG. 4, allows individual attachment strips to be withdrawn seriatim from the stack in that enclosure.

FIG. 16 illustrates a plurality of the attachment strips 50 adapted for use in an enclosure 20 of the type illustrated in FIG. 4. The plurality of attachment strips 50 illustrated in FIG. 16 are releasably adhered to each other by releasable adhesion of the layers 57 of pressure sensitive adhesive to form a stack 58 with adjacent ends and longitudinal edges of the strips 50 in the stack 58 aligned and with the first and second ends 54 and 55 of successive strips 50 in the stack 58 adjacent. The strips 50 include release means for providing a first adhesion level between the layer 57 of adhesive and the adjacent strip underlying strip 50 in the stack along a first end portion **54*a* (see FIG. 15) of each of the strips 10 adjacent its first end 54 that affords easy separation of that first end portion 54*a* from the underlying strip 50, and attachment means for providing a second adhesion level along a second end portion 59 (see FIG. 15) of each of the strips 50 adjacent its second end 55 and the adjacent underlying strip 50 in the stack 58 that is higher than the release force along the first end portion 54*a* and firmly adheres the strip 50 to the adjacent underlying strip 50 in the stack 58 during separation of the first end portion 54*a* of the strip 50 from the underlying strip 50 along its first end portion 55 while affording peeling away of that strip 50 from the underlying strip in the stack 58 along its second end portion 59**.

That combination of release means and attachment means can be provided in many ways including (1) by applying the same release coatings over the fields of hooks 56 along the second end portions 59 of the strips 50 and on the first surfaces 52 of the backing layers 51 along the first end portions **54*a* of the strips 50 (suitable release materials are described in U.S. Pat. No. 3,011,988 and EP 618,509) so that the layers 57 of adhesive will release more easily from the fields of hooks 56 because of the smaller contact area along the fields of hooks 56; (2) using two different adhesives to form the layer 57 of adhesive, including a less aggressive adhesive along the first end portions 54*a* of the strips 50 than along the second end portions 59 of the strips 50; (3) adjusting the number of hooks in the fields of hooks 56 along the second end portions 59 of the strips 50 so that the layers 57 of adhesive will adhere much less aggressively to the fields of hooks 56 along the second end portions 59 than to the first surfaces 52 along the first end portions 54*a* of the strips 50**; or (4) combinations of the above three ways.

Alternatively, the strips 50 could include release means for providing a first adhesion level between the layers 57 of adhesive and the adjacent underlying strips 50 in the stack along the second end portion 59 of each of the strips 50 that affords easy separation of that second end portion 59 from the underlying strip 50, and attachment means for providing a second adhesion level along the first end portion **54*a* of each of the strips 50 and the adjacent underlying strip 50 in the stack 58 that is higher than the release force along the second end portion 59 and firmly adheres the strip 50 to the adjacent underlying strip 50 in the stack 58 during separation of the second end portion 59 of the strip 50 from the underlying strip 50 along its second end portion 59 while affording peeling away of that strip 50 from the underlying strip in the stack 58 along its first end portion 54*a*. That combination of release means and attachment means can also be provided in many ways including (1) by applying release coatings over the surface 52 on the second end portions 59 of the strips 50 but no release coatings over the fields of hooks 56; (2) using two different adhesives to form the layer 57 of adhesive, including a more aggressive adhesive along the first end portions 54*a* of the strips 50 than along the second end portions 59 of the strips 50; (3) applying a removable release liner over the layer 57 of adhesive along the second end portions 59 of the strips 50**; or (4) combinations of the above three ways.

The stack 58 of strips 50 can be positioned in the chamber 21 of the enclosure 20 illustrated in FIG. 4 with the ends 54 and 55 of the strips 50 generally parallel to the ends 23 of its bottom wall 22, and (assuming the strips 50 include release means for providing a first adhesion level between the layers 57 of adhesive and the adjacent underlying strip 50 in the stack along the first end portion **54*a* that is less than the second adhesion level along the second end portion 59 of each of the strips 50 as described above) with the first end portion 54*a* of the uppermost strip 50 in the stack 58 projecting through the slot 27 and resting against the adjacent abutment surface 26. Tension can then be manually applied to that first end portion 54*a* of the uppermost strip 50 to pull it through the slot 27. That tension will cause successive portions of the second end portion 54*a* of the uppermost strip 50 to peel from the second end portion 59 of the first underlying strip 50 in the stack 58 and will cause separation of the first end portion 54*a* of that first underlying strip 50 from the first end portion 54*a* of the second underlying strip 50, and movement of the first end portion 54*a* of the first underlying strip 50 through the slot 57 with the second end portion 59 of the uppermost strip 50 to leave, after the uppermost strip 50 is fully peeled from the first end portion 57 of the first underlying strip 50, the first end portion 54*a* of the first underlying strip 50 in a position projecting through the slot 27 and resting against the abutment surface 26 opposite the abutment surface 26 against which the uppermost strip 50 was originally supported, disposed in a position where it may be grasped for manual removal in a manner similar to the removal of the uppermost strip 50**.

Figure 18:
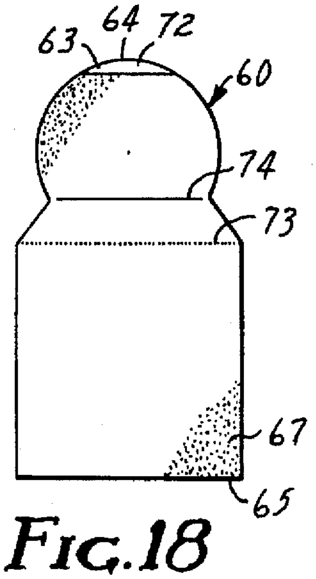
FIG. 18 is a bottom view of a forth embodiment of an attachment strip according to the present invention.
Figure 19:
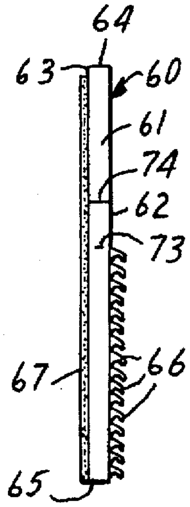
FIG. 19 is an edge view of the attachment strip of FIG. 18.
Figure 20:
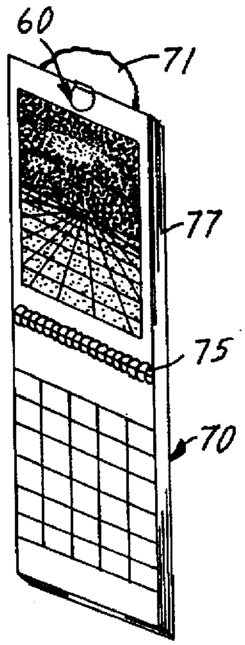
FIG. 20 illustrates the attachment strip of FIG. 18 attaching a calendar to a vertical substrate.
Figure 21:
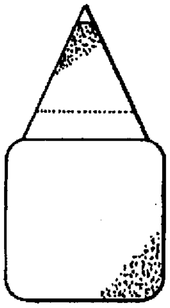
FIGS. 21 through 25 illustrate alternative shapes for an attachment strip similar to that illustrated in FIG. 18.
Figure 22:
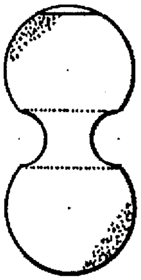
Figure 23:
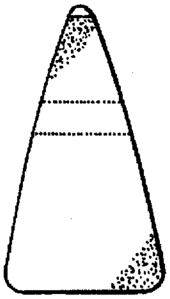
Figure 24:
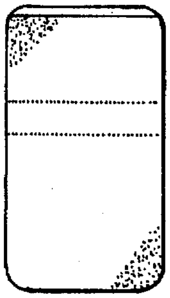
Figure 25:
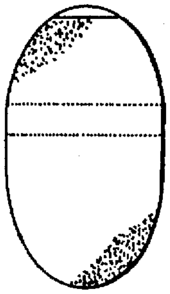

Referring now to FIGS. 18 through 20 of the drawing, there is shown a fifth embodiment of an attachment strip according to the present invention generally designated by the reference numeral 60.

The attachment strip 60 is similar to the attachment strip 50, but has been specially adapted for use in attaching to a vertical substrate 71 a plurality of pages or sheets bound along one edge (e.g., a booklet having lines of graphics read parallel to its binding, such as a calendar 70 illustrated in FIG. 20 that comprises sheets or pages bound by a helical wire binding 75).

Generally, the attachment strip 60 comprises a flexible backing layer 61 having opposite first and second major surfaces 62 and 63 and first and second opposite ends 64 and 65. A field of hooks 66 integral with at least a portion of the backing layer 61 are along and project from a portion of or about half of the first surface 62 adjacent the second end 65 of the backing layer 61. A layer 67 of pressure sensitive adhesive covers almost the entire second surface 63 of the backing layer 61 except for a small area 72 adjacent its first end 64 which gives a user of the attachment strip 60 access to that small area 72 at its first end 64 so that it can be peeled away from a substrate or page (alternatively, the second surface 63 of the backing layer 61 could be entirely covered with the layer 67 of adhesive and the adhesive along the small area 72 could be covered with a tab). The materials and structure of the backing layer 61, field of hooks 66, and the layer 67 of adhesive are essentially the same as those described above with respect to the attachment strip 10. The backing layer 61 has transverse spaced first and second parallel creases 73 and 74. The first crease 73 is at the side of the field of hooks 66 opposite the second end 65. A first end portion or main attachment portion of the attachment strip 60 between the second end 65 and the first crease 73 is adapted to have the portion of the layer 67 of pressure sensitive adhesive thereon adhered to the rear surface of the rear page 77 of the calendar 70 at the center of its edge opposite the binding 75 and to have the field of hooks 66 thereon attached to the vertical substrate 71 so that the main attachment portion will support that rear page 77 and thereby the binding 75 of the calendar 70 horizontally below the strip 60 with all or some of the other bound pages hanging below the binding 75, while some of the other bound pages can, alternatively, project upwardly from the binding 75 and overlay the rear page 77. A central portion of the attachment strip 60 between the first and second creases 73 and 74 is adapted to extend around the upper edges of the rear page 77 and any other upwardly projecting pages of the calendar 70, and a second end portion or retaining portion of the attachment strip 60 between the second crease 74 and the first end 64 of the backing layer 61 can be removably adhered to the surface of the upwardly projecting page farthest from the rear page 77 to releasably retain it and the upwardly projecting pages between it and the rear page 77 in that position.. Typically pages of the calendar 70 showing the days for the current month and the months remaining in the current year hang below the binding 75 with the current month outermost, and pages that show the days for past months project upwardly from the binding 75 and overlay the rear page 77 that is attached to the substrate by the main attachment portion of the strip 60 with the retaining portion of the attachment strip 60 retaining those upwardly projecting pages in that position, while being removable to afford movement of the pages from the hanging position to that upwardly projecting position to change the month being displayed.

The attachment strip 60 can be used to attach the calendar 70 to the vertical substrate 71 (e.g., a cloth surface of an office cubicle wall) by adhering the part of the layer 67 of adhesive opposite the field of hooks 66 to the rear page 77 of the calendar centrally along its edge opposite the binding 75, engaging the field of hooks 66 with loops or loop like fiber portions along the substrate 71, bending the backing layer 61 at the first crease 73 so that the central portion of the attachment strip 60 extends along the top edge of the calendar 70 around the edges of the rear page 77 and other upwardly projecting pages, bending the backing layer 61 at the crease 74 so that the retaining portion of the attachment strip 60 extends along the front surface of the outermost upwardly projecting page, and adhering the portion of the layer 67 of repositionable adhesive thereon to that outermost page to retain it and the other upwardly projecting pages along the rear page 77, thereby exposing the desired page hanging from the binding 75 that represents the desired month. When a page on the calendar 70 is to be included under that retaining portion of the attaching strip 60, the retaining portion can be manually peeled away from the outermost upwardly projecting page by engaging the area 72, the edge portion of the new page can be positioned over the other upwardly projecting pages, and that retaining portion can then be adhered to the outer surface of that new page to maintain it and any other upwardly projecting pages in a position projecting above the binding 75 and spaced from the downwardly hanging calendar page the user wishes to view.

FIGS. 21 through 25 illustrate alternative shapes that, among others, could be used for the backing layer 61 of the attaching strip 60.

Figure 26:
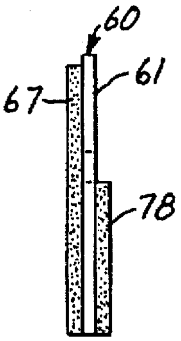
FIG. 26 illustrates use of alternate attachment means for the attachments strips of FIGS. 18 through 25.
Figure 27:
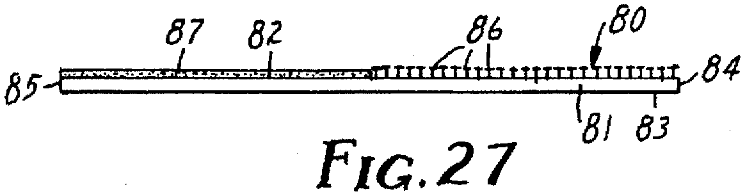
FIG. 27 is an edge view of a sixth embodiment of an attachment strip according to the present invention.
Figure 28:
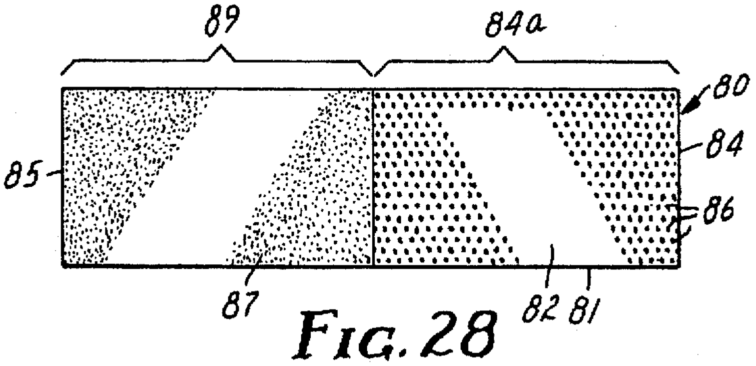
FIG. 28 is a top view of the attachment strip illustrated in FIG. 27.

FIG. 26 illustrates that a layer 78 of pressure sensitive adhesive could be substituted for the field of hooks 66 on the attaching strip 60, (e.g., the layer 78 could be of the stretch release adhesive described in PCT International Publication Number WO 92/11333 dated 9 Jul. 1992, the content whereof is incorporated herein by reference, or could be of permanent or repositionable pressure sensitive adhesives of the type described above) should that be desirable to attach it to a smooth substrate (e.g., a wall surface of plaster, plaster board, paneling, metal or concrete).

Referring now to FIGS. 27 through 30 of the drawing, there is shown a sixth embodiment of an attachment strip according to the present invention generally designated by the reference numeral 80.

Generally the attachment strip 80 comprises a flexible backing layer 81 having opposite first and second major surfaces 82 and 83 and first and second opposite ends 84 and 85. A field of hooks 86 integral with at least a portion of the backing layer 81 are along and project from a portion of or about half of the first surface 82 adjacent the first end 84 of the backing layer 81. A layer 87 of pressure sensitive adhesive also covers a portion of or about half of the first surface 82 adjacent the second end 85 of the backing layer 81. The materials of the backing layer 81, field of hooks 86, and layer 87 of adhesive are essentially the same as those described above with respect to the attachment strip 10.

Figure 30:
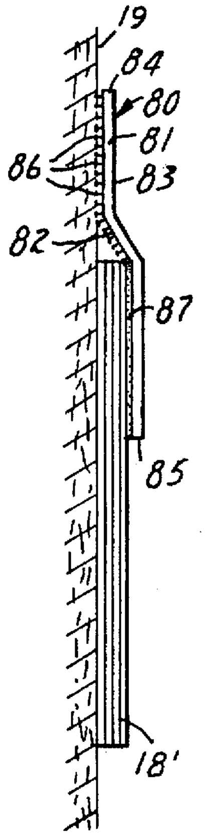
FIG. 30 is a side view of the attachment strip of FIG. 27 attaching an object to a vertical substrate.

As is illustrated in FIG. 30, the attachment strip 80 can be used to attach an object 18' (e.g., a document of several pages in which the pages are attached together by tape or staples or other attaching or binding means) to the vertical substrate 19 (e.g., a cloth surface of an office cubicle wall) by adhering the layer 87 of adhesive to a from surface of the object 18', bending the attachment strip 80 so that it extends around the top edge of the object 18', and engaging the field of hooks 86 with loops or loop like fiber portions along the substrate 19 above the object 18'.

Figure 29:
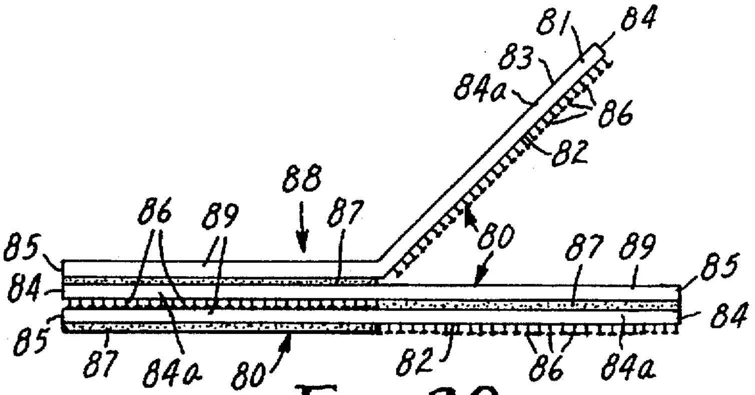
FIG. 29 is an edge view of a plurality of attachment strips of the type illustrated in FIG. 27 adhered together in a stack which, when enclosed in an enclosure of the type illustrated in FIG. 4, allows individual attachment strips to be withdrawn seriatim from the stack in that enclosure.

FIG. 29 illustrates a plurality of the attachment strips 80 adapted for use in an enclosure 20 of the type illustrated in FIG. 4. The plurality of attachment strips 80 illustrated in FIG. 29 are releasably adhered to each other by releasable adhesion of the layers 87 of pressure sensitive adhesive with the second surfaces 83 of the backing layers 81 of adjacent strips 80 to form a stack 88 with adjacent ends and longitudinal edges of the strips 80 in the stack 88 aligned and with the first and second ends 84 and 85 of successive strips 80 in the stack 88 adjacent. Along a first end portion **84*a* (see FIG. 29) of each of the strips 80 adjacent its first end 84 the strips 80 are not adhered to the adjacent underlying strip 80** in the stack 88 to afford easy separation of surfaces of adjacent strips 80 along that first end portion 84*a*. Attachment means (i.e., the presence of the layer 87 of adhesive) provides a second adhesion level along a second end portion 89 (see FIG. 28) of each of the strips 80 adjacent its second end 85 between the layer 87 of adhesive and the adjacent underlying strip 80 in the stack 88. That second adhesion level provides a release force between the second end portion 89 of the strip 80 and the underlying strip 80 that is higher than the essentially zero release force along the first end portion 84*a* of the strip 80 and the underlying strip 80, and firmly adheres the strip 80 to the adjacent underlying strip 80 in the stack 88 during separation of one of the strips 80 along its first end portion 84*a* while affording peeling away of that strip 80 from the stack 88 along its second end portion 89. This second adhesion level may be provided at a desired level through the use of an appropriate release material on the surface 83.

The stack 88 of strips 80 can be positioned in the chamber 21 of the enclosure 20 illustrated in FIG. 4 with the ends 84 and 85 of the strips 80 generally parallel to the ends 23 of its bottom wall 22, and with the first end portion 84*a* of the uppermost strip 80 in the stack 88 projecting through the slot 27 and resting against the adjacent abutment surface 26. Tension can then be manually applied to that first end portion 84*a* of the uppermost strip 80 to pull it through the slot 27. That tension will cause successive portions of the second end portion 89 of the uppermost strip 80 to peel from the first underlying strip 80 in the stack 88 and during such peeling will cause separation of the first end portion 84*a* of the first underlying strip 80 from the second underlying strip 80 and subsequent movement of the first end portion 84*a* of the first underlying strip 80 through the slot 27 with the second end portion 89 of the uppermost strip 80 to leave, after the uppermost strip 80 is fully peeled from the first end portion 87 of the first underlying strip 80, the first end portion 87 of the first underlying strip 80 in a position projecting through the slot 27 and resting against the abutment surface 26 opposite the abutment surface 26 against which the uppermost strip 80 was originally supported, disposed in a position where it may be gasped for manual removal in a manner similar to the removal of the uppermost strip 80.

Referring now to FIGS. 31 through 34 of the drawing, there is shown a seventh embodiment of an attachment strip according to the present invention generally designated by the reference numeral 90.

Generally the attachment strip 90 comprises a flexible backing layer 91 having opposite first and second major surfaces 92 and 93 and first and second opposite ends 94 and 95. A field of hooks 96 are integral with at least a portion of the backing layer 91 and project from a portion of or about one fifth of its first surface 92 adjacent the first end 94 of the backing layer 91. A layer 97 of pressure sensitive adhesive covers a portion of or about two thirds of the second surface 93 adjacent the second end 95 of the backing layer 91. The materials in the backing layer 91, field of hooks 96, and layer 97 of adhesive are essentially the same as those described above with respect to the attachment strip 10.

While not illustrated, the attachment strip 90 could be used to attach an object (e.g., a photograph, a sheet of paper beating information, etc.) to a vertical substrate (e.g., a cloth surface of an office cubicle wall) by adhering the layer 97 of adhesive to a rear surface of the object, and engaging the field of hooks 96 with loops or loop like fiber portions along the substrate.

Figure 32:
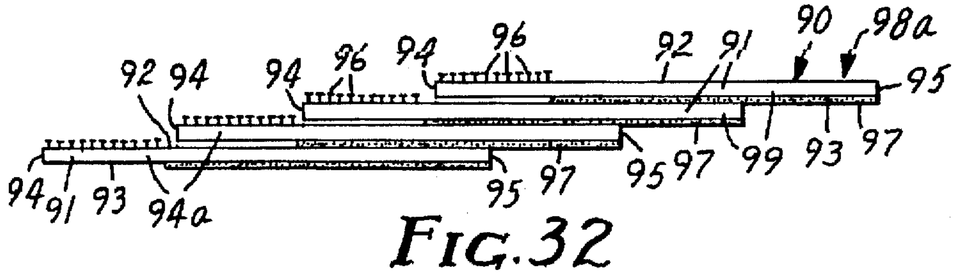
FIGS. 32 and 33 are each edge views of a plurality of attachment strips of the type illustrated in FIG. 31 adhered together in two different manners to form stacks.
Figure 33:
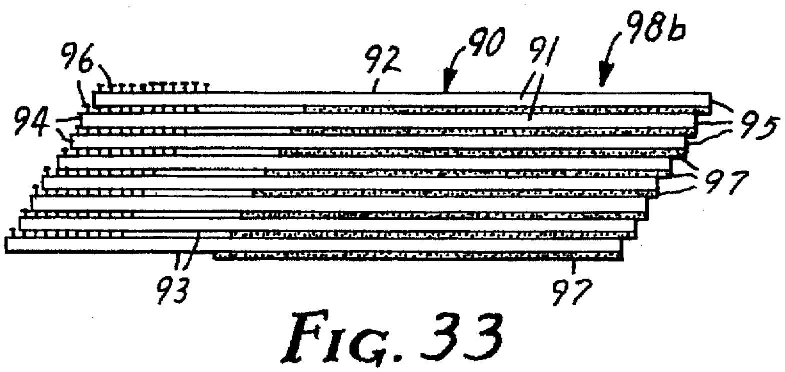

FIGS. 32 and 33 each illustrate a plurality of the attachment strips 90 releasably adhered to each other by releasable adhesion of the layers 97 of pressure sensitive adhesive to form a stack 98*a* and 98*b* respectively with adjacent longitudinal edges of the strips 90 in each stack 98*a* and 98*b* aligned and with the corresponding ends 94 and 95 of successive strips 90 in the stack 98 adjacent. A first end portion 94*a* (see FIG. 31) of each of the strips 90 adjacent its first end 94 projects beyond the first end 94 of the overlying strip 90 and the first end portions 94*a* of the strips 90 are not adhered to the adjacent strip 90 in the stack 98*a* and 98*b* to afford easy separation of surfaces of adjacent strips 90 along that first end portion 94*a* to peel individual strips 90 from the tops of the stacks 98*a* and 98*b*. The top strip 90 from either stack 98*a* or 98*b* can be peeled away without much tendency to lift additional strips 90 from the stack 98*a* or 98*b* because that peel is initiated at a point along (rather than aligned with the ends of) the layers 97 of adhesive on the underlying strips 90. The first end portions 94*a* of the strips 90 in the stack 98*a* (FIG. 32) project sufficiently beyond the first end 94 of the overlying strip 90 so that the fields of hooks 96 on the strips 90 are not overlaid by the adjacent strip 90 in the stack 98*a*, thereby providing a minimum vertical height for the stack 98*a*.

Figure 34:
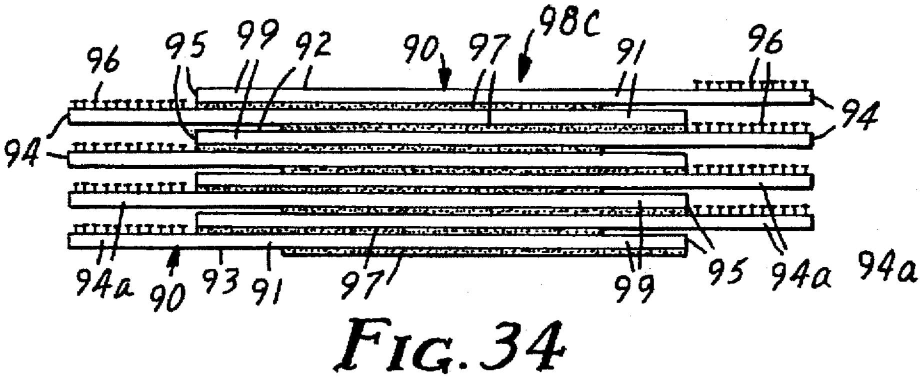
FIG. 34 is an edge view of a plurality of attachment strips of the type illustrated in FIG. 31 adhered together in a stack which, when enclosed in an enclosure of the type illustrated in FIG. 4, allows individual attachment strips to be withdrawn seriatim from the stack in that enclosure.
Figure 31:
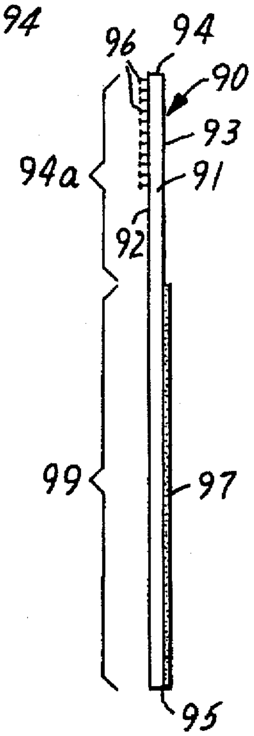
FIG. 31 is an edge view of a seventh embodiment of an attachment strip according to the present invention.
Figure 38:
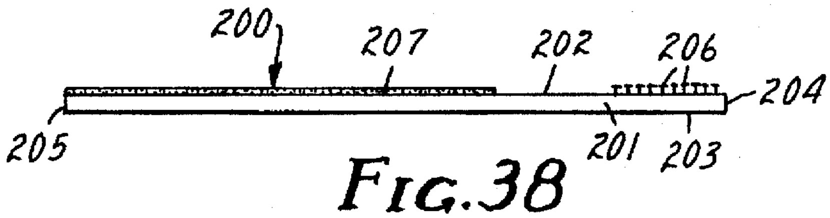
FIG. 38 is an edge view of a ninth embodiment of an attachment strip according to the present invention.
Figure 39:
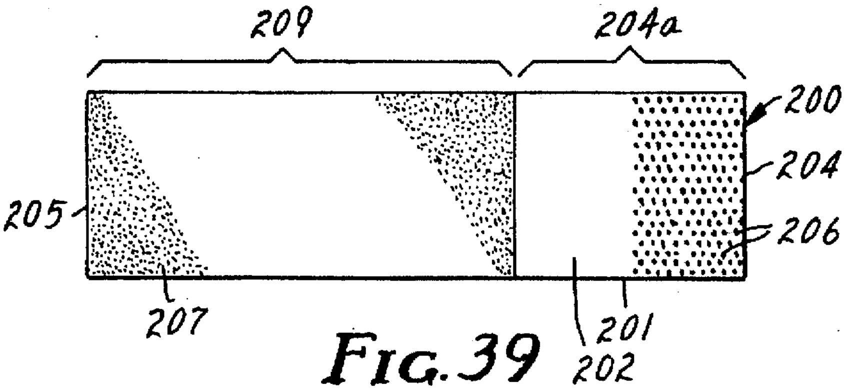
FIG. 39 is a top view of the attachment strip illustrated in FIG. 38.

FIG. 34 illustrates a plurality of the attachment strips 90 adapted for use in an enclosure 20 of the type illustrated in FIG. 4. The plurality of attachment strips 90 illustrated in FIG. 34 are releasably adhered to each other by releasable adhesion of the layers 97 of pressure sensitive adhesive to form a stack 98*c* with adjacent longitudinal edges of the strips 90 in the stack 98*c* aligned and with the first and second ends 94 and 95 of successive strips 90 in the stack 98*c* adjacent. The first end 94 of each of the strips 90 projects a uniform distance beyond the second end 95 of the adjacent strips 90 and along a first end portion 94*a* of each of the strips 90 adjacent its first end 94 the strips 90 are not adhered to the adjacent underlying strips 90 in the stack 98*c* to afford easy separation of surfaces of adjacent strips 90 along that first end portion 94*a*. The strips 90 also include attachment means (i.e., the presence of the layer 97 of adhesive) for providing a second adhesion level along a second end portion 99 (see FIG. 31) of each of the strips 90 adjacent its second end 95 between the layer 97 of adhesive and the adjacent underlying strip 90 in the stack 98*c*. That second adhesion level provides a release force with the underlying strip 90 along the second end portion 99 that is higher than the essentially zero release force along the first end portion 94*a* and firmly adheres the strip 90 to the adjacent underlying strip 90 in the stack 98*c* during separation of the strip 90 along its first end portion 94*a* while affording peeling away of the strip 90 from the underlying strip 90 in the stack 98*c* along its second end portion 99.

The stack 98*c* of strips 90 can be positioned in the chamber 21 of the enclosure 20 illustrated in FIG. 4 with the ends 94 and 95 of the strips 90 generally parallel to the ends 23 of its bottom wall 22, and with the first end portion 94*a* of the uppermost strip 90 in the stack 98*c* projecting through the slot 27 and resting against the adjacent abutment surface 26. Tension can then be manually applied to that first end portion 94*a* of the uppermost strip 90 to pull it through the slot 27. Such tension will cause successive portions of the second end portion 99 of the uppermost strip 90 to peel from the first end portion 94*a* of the first underlying strip 90 in the stack 98*c* and during that peeling will cause separation of the first end portion 94*a* of the first underlying strip 90 from the second end portion 99 of the second underlying strip 90, and movement of the first end portion 94*a* of the first underlying strip 90 through the slot 27 with the second end portion 99 of the uppermost strip 90 to leave, after the uppermost strip 90 is fully peeled from the first end portion 94*a* of the first underlying strip 90, the first end portion 94*a* of the first underlying strip 90 in a position projecting through the slot 27 and resting against the abutment surface 26 opposite the abutment surface 26 against which the uppermost strip 90 was originally supported, disposed in a position where it may be grasped for manual removal in a manner similar to the removal of the uppermost strip 90.

Figure 36:
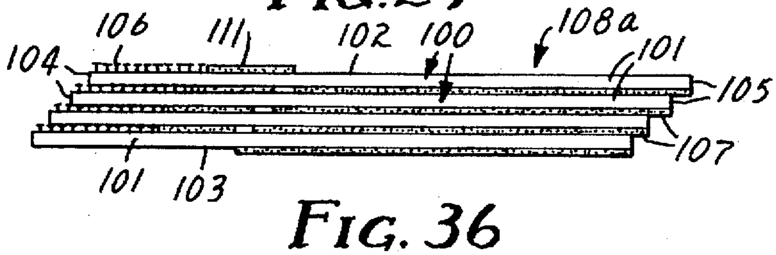
FIG. 36 is an edge view of a plurality of attachment strips of the type illustrated in FIG. 35 adhered together to form a stack.
Figure 37:
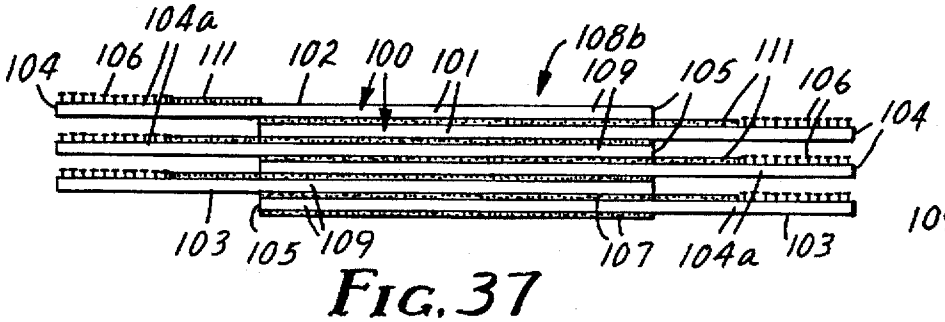
FIG. 37 is an edge view of a plurality of attachment strips of the type illustrated in FIG. 35 adhered together in a stack which, when enclosed in an enclosure of the type illustrated in FIG. 4, allows individual attachment strips to be withdrawn seriatim from the stack in that enclosure.
Figure 35:
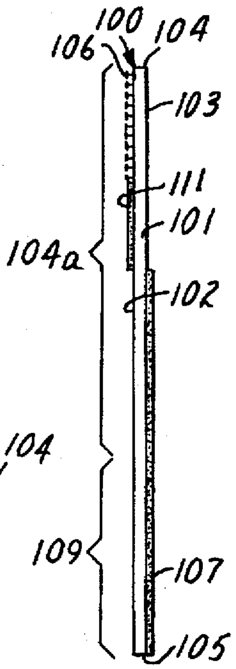
FIG. 35 is an edge view of an eighth embodiment of an attachment strip according to the present invention.

Referring now to FIGS. 35 through 37 of the drawing, there is shown a eighth embodiment of an attachment strip according to the present invention generally designated by the reference numeral 100.

Generally the attachment strip 100 comprises a flexible backing layer 101 having opposite first and second major surfaces 102 and 103 and first and second opposite ends 104 and 105. A field of hooks 106 are along and project from a portion of or about one fifth of the first surface 102 adjacent the first end 104 of the backing, and a layer 107 of pressure sensitive adhesive covers a portion of or about two thirds of the second surface 103 adjacent the second end 105 of the backing layer 101. Also, a layer 111 of pressure sensitive adhesive is along a portion of the first surface 102 adjacent the field of hooks 106 generally positioned (longitudinally of the backing layer 101) between the field of hooks 106 and the adjacent end of the layer 107 of adhesive. The materials and structures of the backing layer 101, field of hooks 106, and layer 107 of adhesive are essentially the same as those described above with respect to the attachment strip 10. The layer 111 of adhesive can include a layer of non-woven scrim or foam material to give it a thickness approximating the thickness of the field of hooks 106 to facilitate adhering that layer 111 of adhesive against a substrate.

While not illustrated, the attachment strip 100 could be used to attach an object (e.g., a photograph, a sheet of paper bearing information, etc.) to a vertical substrate (e.g., a cloth surface of an office cubicle wall or a smooth wall of painted plaster, wallboard, metal or cement or ceramic materials, etc.) by adhering the layer 107 of adhesive to a rear surface of the object, and either engaging the field of hooks 106 with loops or loop like fiber portions along the substrate, or adhering the layer 111 of adhesive to the substrate, as is appropriate for the material of the substrate.

FIG. 36 illustrates a plurality of the attachment strips 100 releasably adhered to each other by releasable adhesion of the layers 107 of pressure sensitive adhesive to form a stack 108*a* with adjacent longitudinal edges of the strips 100 in the stack 108*a* aligned and with the corresponding ends 104 and 105 of successive strips 100 in the stack 108*a* adjacent. The layers 111 of adhesive of the strips 100 are either not adhered to the adjacent strips 100 in the stack 108*a* because they are covered with a removable release liner (not illustrated) or are only lightly adhered thereto because the adjacent surface 103 of the adjacent strip 100 is coated with a release material. Also, a part of each of the strips 100 adjacent its first end 104 projects beyond the first end 104 of the overlying strip 100 so that the top strip 100 can be peeled away from the stack 108*a* without much tendency to lift additional strips 100 from the stack 108*a* because that peel is initiated at a point along (rather than aligned with the ends of) the layers 107 of adhesive on the underlying strips 100 in the stack 108*a*.

FIG. 37 illustrates a plurality of the attachment strips 100 adapted for use in an enclosure 20 of the type illustrated in FIG. 4. The plurality of attachment strips 100 illustrated in FIG. 37 are releasably adhered to each other by releasable adhesion of the layers 107 of pressure sensitive adhesive to form a stack 108*b* with adjacent longitudinal edges of the strips 100 in the stack 108*b* aligned and with the first and second ends 104 and 105 of successive strips 100 in the stack 108*b* adjacent. The first end 104 of each of the strips 100 projects a uniform distance beyond the second ends 105 of the adjacent strips 100. The strips 100 include release means for providing a first adhesion level between part of the layer 107 of adhesive along a first end portion 104*a* (see FIG. 35) of each strip 100 adjacent its first end 104 and the first surface 102 on the adjacent underlying strip 100 in the stack 108*b* and between the layers 111 of adhesive and the second surface 103 of the adjacent overlaying strip 100 that affords fairly easy separation therebetween along that first end portion 104*a*. The strips 100 also include attachment means for providing a second adhesion level between the layer 107 of adhesive along a second end portion 109 (see FIG. 35) of each strip 100 adjacent its second end 105 and the first surface 102 on the adjacent underlying strip 100 in the stack 108*b* that provides a release force therebetween along that second end portion 109 that is higher than the release force therebetween along the first end portion 104*a* and firmly adheres the uppermost strip 100 to the adjacent underlying strip 100 in the stack 108*b* during separation of the uppermost strip 100 from the underlying strip 100 along its first end portion 104*a* while affording peeling away of the uppermost strip 100 from the stack 108*b* along its second end portion 109.

That combination of release means and attachment means can be provided in many ways including by (1) applying a different release coating that provides a more easy release over the first surfaces 102 on the backing layers 101 along the second end portions 109 of the strips 100 than is applied over the first surfaces 102 on the backing layers 101 along the first end portions 104*a* of the strips 100; or utilizing different patterns of the same release coating in those areas as is taught in European patent application 452368A filed Dec. 22, 1989, (2) using two different adhesives to form the layers 107 of adhesive, including a less aggressive adhesive along the first end portions 104*a* of the strips 100 than along the second end portions 109 of the strips 100; (3) providing removable release liners over the layer 107 of adhesive along the first end portions 104*a;* or (4) combinations of the above three ways.

Also, either removable release liners are applied over the layers 111 of adhesive, or the second surfaces 103 of the backing layers 101 adjacent the end of the layers 107 of adhesive are coated with a release material to prevent significant adhesion therebetween.

The stack 108*b* of strips 100 can be positioned in the chamber 21 of the enclosure 20 illustrated in FIG. 4 with the ends 104 and 105 of the strips 100 generally parallel to the ends 23 of its bottom wall 22, and with the first end portion 104*a* of the uppermost strip 100 in the stack 108*b* projecting through the slot 27 and resting against the adjacent abutment surface 26. Tension can then be applied to that first end portion 104*a* of the uppermost strip 100 to pull it through the slot 27. That tension will cause successive portions of the second end portion 109 of the uppermost strip 100 to peel from the first end portion 104*a* of the first underlying strip 100 in the stack 108*b* and during that peeling will cause separation of the first end portion 104*a* of the first underlying strip 100 from the second end portion 109 of the second underlying strip 100 and movement of the first end portion 104*a* of the first underlying strip 100 through the slot 27 with the second end portion 109 of the uppermost strip 100 to leave, after the uppermost strip 100 is fury peeled from the first end portion 104*a* of the first underlying strip 100, the first end portion 104*a* of the first underlying strip 100 in a position projecting through the slot 27 and resting against the abutment surface 26 opposite the abutment surface 26 against which the uppermost strip 100 was originally supported and disposed in a position where it may be gasped for manual removal in a manner similar to the removal of the uppermost strip 100.

Referring now to FIGS. 38 through 41 of the drawing, there is shown a ninth embodiment of an attachment strip according to the present invention generally designated by the reference numeral 200.

Generally the attachment strip 200 comprises a flexible backing layer 201 having opposite first and second major surfaces 202 and 203 and first and second opposite ends 204 and 205. A field of hooks 206 on a backing laminated or adhered to and thereby incorporated in the backing layer 201 are along and project from a small portion or about 16 percent of the first surface 202 adjacent the first end 204 of the backing layer 201. A layer 207 of pressure sensitive adhesive also covers a portion of or about two thirds of the first surface 202 adjacent the second end 205 of the backing layer 201. The materials and structure of the field of hooks 206 are essentially the same as those described above with respect to the attachment strip 10. The backing layer 201 and layer 207 of adhesive are the structure called a "Post-it"(™) tape flag sold by Minnesota Mining and Manufacturing Company, St. Paul, Minn.

Figure 41:
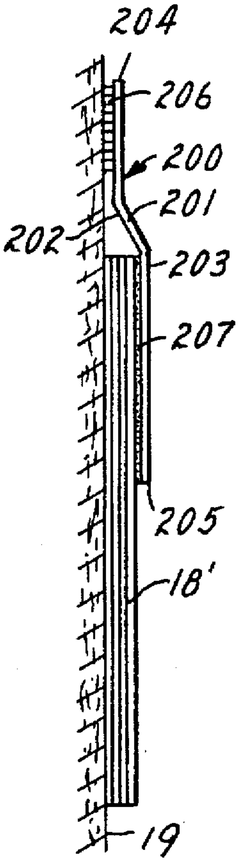
FIG. 41 is a side view of the attachment strip of FIG. 38 attaching an object to a vertical substrate.

As is illustrated in FIG. 41, the attachment strip 200 can be used to attach an object 18' (e.g., a document of several pages in which the pages are attached together by tape or staples or other attaching or binding means) to the vertical substrate 19 (e.g., a cloth surface of an office cubicle wall) by adhering the layer 207 of adhesive to a front surface of the object 18' near the attaching or binding means, bending the attachment strip 200 so that it extends around the top edge of the object 18', and engaging the field of hooks 206 with loops or loop like fiber portions along the substrate 19 above the object 18'. To help the user recognize this intended use, the attachment strip 200 may have the image of a thumb tack printed on its second surface 203 opposite the field of hooks 206.

Figure 40:
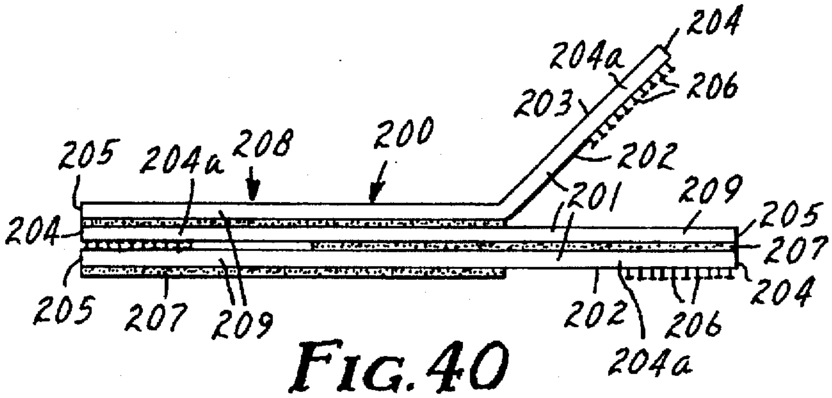
FIG. 40 is an edge view of a plurality of attachment strips, of the type illustrated in FIG. 38 adhered together in a stack which, when enclosed in an enclosure of the type illustrated in FIG. 4, allows individual attachment strips to be withdrawn seriatim from the stack in that enclosure.

FIG. 40 illustrates a plurality of the attachment strips 200 adapted either for use in an enclosure 20 of the type illustrated in FIG. 4, or in the enclosure from which "Post-it" brand tape flags are typically dispensed which is described in U.S. Pat. No. 4,770,320 issued Sep. 13, 1988, the content whereof is incorporated herein by reference. The plurality of attachment strips 200 illustrated in FIG. 40 are releasably adhered to each other by releasable adhesion of the layers 207 of pressure sensitive adhesive with the second surfaces 203 of the backing layers 201 of adjacent strips 200 to form a stack 208 with adjacent ends and longitudinal edges of the strips 200 in the stack 208 aligned and with the first and second ends 204 and 205 of successive strips 200 in the stack 208 adjacent. Along a first end portion 204*a* (see FIG. 39) of each of the strips 200 adjacent its first end 204 the strips 200 are not adhered to the adjacent underlying strip 200 in the stack 208 to afford easy separation of surfaces of adjacent strips 200 along that first end portion 204*a*. Attachment means (i.e., the presence of the layer 207 of adhesive) provides a second adhesion level along a second end portion 209 (see FIG. 28) of each of the strips 200 adjacent its second end 205 between the layer 207 of adhesive and the adjacent underlying strip 200 in the stack 208. That second adhesion level provides a release force between the second end portion 209 of the strip 200 and the underlying strip 200 that is higher than the essentially zero release force along the first end portion 204*a* of the strip 200 and the underlying strip 200, and firmly adheres the strip 200 to the adjacent underlying strip 200 in the stack 208 during separation of one of the strips 200 along its first end portion 204*a* while affording peeling away of that strip 200 from the stack 208 along its second end portion 209. This second adhesion level may be provided at a desired level through the use of an appropriate release material on the surface 203.

The stack 208 of strips 200 can be positioned in the chamber 21 of the enclosure 20 illustrated in FIG. 4 with the ends 204 and 205 of the strips 200 generally parallel to the ends 23 of its bottom wall 22, and with the first end portion 204*a* of the uppermost strip 200 in the stack 208 projecting through the slot 27 and resting against the adjacent abutment surface 26. Tension can then be manually applied to that first end portion 204*a* of the uppermost strip 200 to pull it through the slot 27. That tension will cause successive portions of the second end portion 209 of the uppermost strip 200 to peel from the first underlying strip 200 in the stack 208 and during such peeling will cause separation of the first end portion 204*a* of the first underlying strip 200 from the second underlying strip 200 and subsequent movement of the first end portion 204*a* of the first underlying strip 200 through the slot 27 with the second end portion 209 of the uppermost strip 200 to leave, after the uppermost strip 200 is fully peeled from the first end portion 207 of the first underlying strip 200, the first end portion 207 of the first underlying strip 200 in a position projecting through the slot 27 and resting against the abutment surface 26 opposite the abutment surface 26 against which the uppermost strip 200 was originally supported, disposed in a position where it may be grasped for manual removal in a manner similar to the removal of the uppermost strip 200.

As an alternative to the enclosure 20, strips 200 from the stack 208 of strips 200 can be dispensed from the commercially available enclosure from which "Post-it" brand tape flags are typically dispensed which is described in U.S. Pat. No. 4,770,320 issued Sep. 13, 1988. That enclosure allows the strips 200 to be removed seriatim from the stack 208 in generally the same way described above with reference to the enclosure 20 except that the enclosure described in U.S. Pat. No. 4,770,320 allows that stack 208 of strips to move or shuttle back and forth in the enclosure as successive strips 200 are removed, thus allowing the slot between the abutment surfaces through which the strips 200 are dispensed to be considerably more narrow than is the slot 27 in the enclosure 20. That enclosure described in U.S. Pat. No. 4,770,320 comprises walls defining a chamber, which walls include a bottom wall defining a bottom side of the chamber and having opposite ends spaced at a significantly greater distance than the length of the backing layers 201 or strips 200 (e.g., 2.3 inch long chamber for 1.72 inch long strips 200 and stack 208), two top wall portions defining a top side of the chamber opposite the bottom side and having spaced opposed first and second abutment surfaces extending generally parallel to the ends of its bottom wall. The abutment surfaces define a narrow generally central transverse slot having a length (e.g., 0.065 inch) between the abutment surfaces that is significantly less than the length (e.g., 1.72 inch) of the backing layers 201. The stack 208 of strips 200 is positioned in the chamber with the ends of the strips 200 generally parallel to the ends of the bottom wall. One of the opposed abutment surfaces is disposed with respect to the uppermost strip 200 in the stack 208 so that the first end portion 204*a* of the uppermost strip 200 can project through the slot and rest against that one abutment surface. The length of the slot between the abutment surfaces and (mostly) longitudinal movement of the stack 208 along the bottom wall affords, as the uppermost strip 200 on the stack 208 is pulled through the slot at its first end portion 204*a*, peeling of successive portions of the uppermost strip 200 from the first underlying strip 200 in the stack 208 to which the uppermost strip 200 is adhered, and then separation of the first end portion 204*a* of the first underlying strip 200 from the second underlying strip 200, and movement of that first end portion 204*a* of the first underlying strip 200 through the slot with the second end portion 209 of the uppermost strip 200 to leave, after the uppermost strip 200 is fully peeled from the first portion 204*a* of the first underlying strip 200, the first end portion 204*a* of the first underlying strip 200 in a position projecting through the slot and resting against the abutment surface opposite the abutment surface against which the removed strip 200 had rested and disposed in a position where it may be gasped for manual removal in a manner similar to the removal of the uppermost strip 200.

The present invention has now been described with reference to several embodiments thereof. It will be apparent to those skilled in the art that many changes can be made in the embodiments described without departing from the scope of the present invention. For example, the other stacks of strips described above can also either be made to dispense from the commercially available enclosure from which "Post-it" brand tape flags are typically dispensed which is described in U.S. Pat. No. 4,770,320, or from a dispenser similar to that in which the slot between the abutment surfaces is widened and movement of the stack along the bottom wall of the enclosure is allowed to facilitate withdrawing the attachment strips from the stacks. Thus the scope of the present invention should not be limited to the structures described in this application, but only by structures described by the language of the claims and the equivalents of those structures.

We claim:

1. An attachment strip for removably attaching an object to a substrate, said attachment strip comprising:

a flexible backing layer having opposite first and second major surfaces and first and second opposite ends;

first attachment means comprising a field of hooks along and projecting from only a portion of said first surface adjacent said first end, and second attachment means comprising a first layer of pressure sensitive adhesive on only a portion of said second surface adjacent said second end.

2. An attachment strip for removably attaching an object to a substrate, said attachment strip comprising:

a flexible backing layer having opposite first and second major surfaces and first and second opposite ends;

first attachment means comprising a field of hooks along and projecting from only a portion of said first surface adjacent said first end and further including a second layer of pressure sensitive adhesive on said first surface, and second attachment means comprising a first layer of pressure sensitive adhesive on said second surface adjacent said second end.

3. An attachment strip according to claim 2 wherein said second layer of pressure sensitive adhesive on said first surface is between said field of hooks and said second end.

4. An attachment strip for removably attaching an object to a substrate, said attachment strip comprising;

a flexible backing layer having opposite first and second major surfaces and first and second opposite ends;

first attachment means comprising a field of hooks along and projecting from said first surface, and second attachment means comprising a layer of pressure sensitive adhesive on said first surface;

said field of hooks being on only a portion of said first surface adjacent said first end, and said layer of pressure sensitive adhesive being on only a portion of said first surface adjacent said second end.

5. An attachment strip according to claim 4 wherein both said field of hooks and said layer of pressure sensitive adhesive extend about half the length of said backing layer.

6. An attachment strip for removably attaching an object to a substrate, said attachment strip comprising:

a flexible backing layer having opposite first and second major surfaces and first and second opposite ends;

a layer of pressure sensitive adhesive extending entirely over said second surface, and a field of hooks extending over only a portion of said first surface adjacent said first end.

7. An attachment strip adapted for use to attach to a vertical substrate a plurality of pages including a rear page having a rear surface, which pages are bound along one edge by a binding, said attachment strip comprising:

a flexible backing layer having opposite first and second major surfaces and first and second opposite ends;

a first layer of repositionable pressure sensitive adhesive extending over most of said second surface; and a second layer of pressure sensitive adhesive extending over a portion of said first surface adjacent said first end;

said backing layer having spaced parallel transverse creases including a first crease at the side of the field of hooks opposite said first end that defines a main attachment portion of said attachment strip between said first end and said first crease adapted to have the portion of said layer of pressure sensitive on said first portion adhered to the rear surface of the rear page centrally on the side of the rear page opposite the binding and to have the field of hooks attached to the vertical substrate so that said main attachment portion will support the rear page thereon with the binding generally horizontal below the main attachment portion, a second crease defining a central portion of said backing between said first and second creases adapted to extend around the edge of the rear page to which said first portion is adhered, and defining a retaining portion between said second crease and said second end that can be removably adhered to a portion of one of the sheets projecting upwardly from the binding that partially defines a front surface of the bound sheets to retain that upwardly projecting one sheet under the retaining portion.

8. An attachment strip adapted for attaching to a vertical substrate a plurality of pages including a rear page having a rear surface, which pages are bound along one edge by a binding, said attachment strip comprising:

a flexible backing layer having opposite first and second major surfaces and first and second opposite ends;

a first layer of repositionable pressure sensitive adhesive extending over most of said second surface; and a second layer of pressure sensitive adhesive extending over a portion of said first surface adjacent said first end;

said backing layer having spaced parallel transverse creases including a first crease at the side of the second layer of pressure sensitive adhesive opposite said first end that defines a main attachment portion of said attachment strip between said first end and said first crease adapted to have the portion of said first layer of pressure sensitive adhesive on said first portion adhered to the rear surface of the rear sheet centrally along its side opposite the binding and to have the second layer of pressure sensitive adhesive adhered to the vertical substrate so that said main attachment portion will support the rear sheet thereon with the binding generally horizontally disposed below the main attachment portion, a second crease defining a central portion of said attaching strip between said first and second creases adapted to extend around the edge of the rear sheet to which said first portion is adhered, said second crease also defining a retaining portion of said attaching strip between said second crease and said second end that can be removably adhered to a portion of one of the sheets projecting upwardly from the binding along the rear sheet and defining at least a portion of the front surface of the bound sheets to retain that one sheet under the retaining portion.

* * * * *